United States Patent
Chen

(10) Patent No.: US 10,500,828 B2
(45) Date of Patent: Dec. 10, 2019

(54) METHOD FOR LAMINATING AND ALIGNING AN IRREGULAR-SHAPE MATERIAL

(71) Applicants: INTERFACE TECHNOLOGY (CHENGDU) CO., LTD., Chengdu (CN); INTERFACE OPTOELECTRONICS (SHENZHEN) CO., LTD., Shenzhen (CN); GENERAL INTERFACE SOLUTION LIMITED, Miaoli County (TW)

(72) Inventor: Yun-Pei Chen, Shenzhen (CN)

(73) Assignees: Interface Technology (Chengdu) Co., Ltd., Chengdu, Sichuan (CN); Interface Optoelectronics (Shenzhen) Co., Ltd., Shenzhen, Guangdong (CN); General Interface Solution Limited, Miaoli County (TW)

( * ) Notice: Subject to any disclaimer, the term of this patent is extended or adjusted under 35 U.S.C. 154(b) by 214 days.

(21) Appl. No.: 15/884,566

(22) Filed: Jan. 31, 2018

(65) Prior Publication Data
US 2019/0193386 A1    Jun. 27, 2019

(30) Foreign Application Priority Data
Dec. 25, 2017   (CN) .......................... 2017 1 1418889

(51) Int. Cl.
| | |
|---|---|
| B32B 41/00 | (2006.01) |
| B32B 38/18 | (2006.01) |
| G06F 3/041 | (2006.01) |
| B32B 17/10 | (2006.01) |

(Continued)

(52) U.S. Cl.
CPC .............. *B32B 41/00* (2013.01); *B32B 38/18* (2013.01); *B32B 17/10954* (2013.01); *B32B 38/0004* (2013.01); *B32B 2457/208* (2013.01); *G02F 1/13338* (2013.01); *G02F 2001/133331* (2013.01); *G06F 3/041* (2013.01);
(Continued)

(58) Field of Classification Search
CPC ........ Y10T 156/1062; B32B 17/10954; B32B 38/0004; B32B 2457/208; G02F 1/13338; G02F 2001/133331; G06F 2203/04103; G06F 3/041
See application file for complete search history.

(56) References Cited

U.S. PATENT DOCUMENTS

| | | | | |
|---|---|---|---|---|
| 9,282,651 B2 * | 3/2016 | Faraci | ................... | H05K 3/4691 |
| 2014/0104512 A1 * | 4/2014 | Huang | ................ | G06F 3/03547 |
| | | | | 349/12 |
| 2014/0150952 A1 * | 6/2014 | Sung | ...................... | G02F 1/1303 |
| | | | | 156/64 |

\* cited by examiner

*Primary Examiner* — Carson Gross
(74) *Attorney, Agent, or Firm* — Rosenberg, Klein & Lee

(57) ABSTRACT

A method for laminating and aligning an irregular-shape material is disclosed. Since the existing laminating material has an irregular shape, there is a problem with disabling alignment in a lamination process. Thus, the irregular shape of the laminating material is used to form a straight line correlated with a tangent line to the shape, and the straight line is used as the shape-aligned feature of the laminating material. Besides, the definition of an alignment relationship between the laminating material and a laminated object is established to adjust a lamination tolerance and prevent the laminating material from overhanging over the laminated object, thereby satisfying consumers' aesthetic needs for the appearance of products.

5 Claims, 5 Drawing Sheets

(51) Int. Cl.
 G02F 1/1333 (2006.01)
 B32B 38/00 (2006.01)
(52) U.S. Cl.
 CPC .............. *G06F 2203/04103* (2013.01); *Y10T 156/1062* (2015.01)

METHOD FOR LAMINATING AND ALIGNING AN IRREGULAR-SHAPE MATERIAL

This application claims priority for China patent application no. 201711418889.5 filed on Dec. 25, 2017, the content of which is incorporated by reference in its entirety.

BACKGROUND OF THE INVENTION

Field of the Invention

The present invention relates to technology for laminating a touch material, particularly to a method for laminating and aligning an irregular-shape material.

Description of the Related Art

Presently, touch panels trend toward non-planar and curved products in the market. 2D or 2.5D products have already appeared in the market. The related supply chains, including those of CORNING, AGC, and SCHOOT, have developed various 3D products and curved glass suited thereto. The lamination technology is an important part of a process of fabricating a touch panel. How to guarantee the lamination yield of products is a bottleneck that touch manufacturers desire to solve.

The lamination process of a touch panel may be a soft-to-soft (STS) process, a soft-to-hard (STH) process, or a hard-to-hard (HTH) process according to physical properties of an object to be laminated. The STS process is used for two soft materials, such as an optical clear adhesive (OCA) and an indium tin oxide (ITO) film. The STH process is used for one soft material and one hard material, such as an anti-scattering film (ASF) and a cover lens. The HTH process is used for two hard materials, such as a touch panel and a liquid crystal module (LCM).

The shapes of the conventional lamination materials for touch panels are symmetrical and regular. However, the shapes of the present lamination materials are irregular, such as non-circle or non-ellipse shapes. The irregular shape is formed by arcs or curves. In a lamination process, there is a problem with disabling alignment. In the non-planar STH process, a lamination machine is provided to use a charge-coupled device (CCD) alignment or a mechanical alignment, thereby adjusting lamination tolerances and preventing the lamination material from overhanging over the laminated object to affect the appearance of products.

To overcome the abovementioned problems, the present invention provides a method for laminating and aligning an irregular-shape material so as to design a shape-aligned feature of an irregular-shape laminating material, satisfy the requirement for the appearance of products, and solve the afore-mentioned problems of the prior art.

SUMMARY OF THE INVENTION

A primary objective of the present invention is to provide a method for laminating and aligning an irregular-shape material, which defines a straight line correlated with a tangent line to the shape of an irregular-shape laminating material as a shape-aligned feature and establishes an alignment relationship between the irregular-shape laminating material and a laminated object, which is provided to a lamination machine for alignment. Thus, the method can avoid appearance defects caused by wrong alignment and satisfy consumers' aesthetic needs for the appearance of products.

To achieve the abovementioned objectives, the present invention provides a method for laminating and aligning an irregular-shape material. Firstly, an irregular-shape laminating material having an irregular curved shape is provided. Then, at least one tangent line to the edge of the irregular curved shape is drawn. Then, the position of the tangent line is moved an appointed distance in a horizontal direction of the irregular curved shape, so as to form a parallel line arranged in parallel to the tangent line. Then, a region between the tangent line and the parallel line is removed to form a feature-aligned curved shape and a straight line of the feature-aligned curved shape that overlaps the parallel line is found. Finally, the straight line is used as a shape-aligned feature and the length of the straight line is defined as the size of the shape-aligned feature recognized by a lamination machine.

In an embodiment of the present invention, the method for laminating and aligning the irregular-shape material is used for a 2.5D or 3D soft-to-hard (STH) lamination process and a laminated object comprises glass or plastic.

In an embodiment of the present invention, the method for laminating and aligning the irregular-shape material further comprising a step of a representative equation described as follows to define an inward-shrinking distance E of the irregular-shape laminating material on the laminated object:

$$E = \tfrac{1}{2}\sqrt{X^2 + Y^2 + Z^2}$$

Wherein Z is the lamination tolerance of the lamination machine;
X is the shape tolerance of the laminated object; and
Y is the shape tolerance of the irregular-shape laminating material.

In an embodiment of the present invention, the size of the shape-aligned feature is 200 μm when a charge-coupled device (CCD) alignment is used.

In an embodiment of the present invention, the size of the shape-aligned feature is 600 μm when a mechanical alignment is used.

The method for laminating and aligning the irregular-shape material of the present invention designs at least one shape-aligned feature corresponding to a laminating material with an irregular curved shape and without a shape-aligned feature to guarantee that the irregular curved shape of the laminating material does not overhang over the laminated object to cause appearance defects, and defines the size of the shape-aligned feature according to different alignments to solve the problem with causing difficulty in alignment to decrease the yield.

Below, the embodiments are described in detail in cooperation with the drawings to make easily understood the technical contents, characteristics and accomplishments of the present invention.

DETAILED DESCRIPTION OF THE INVENTION

Figure 1:
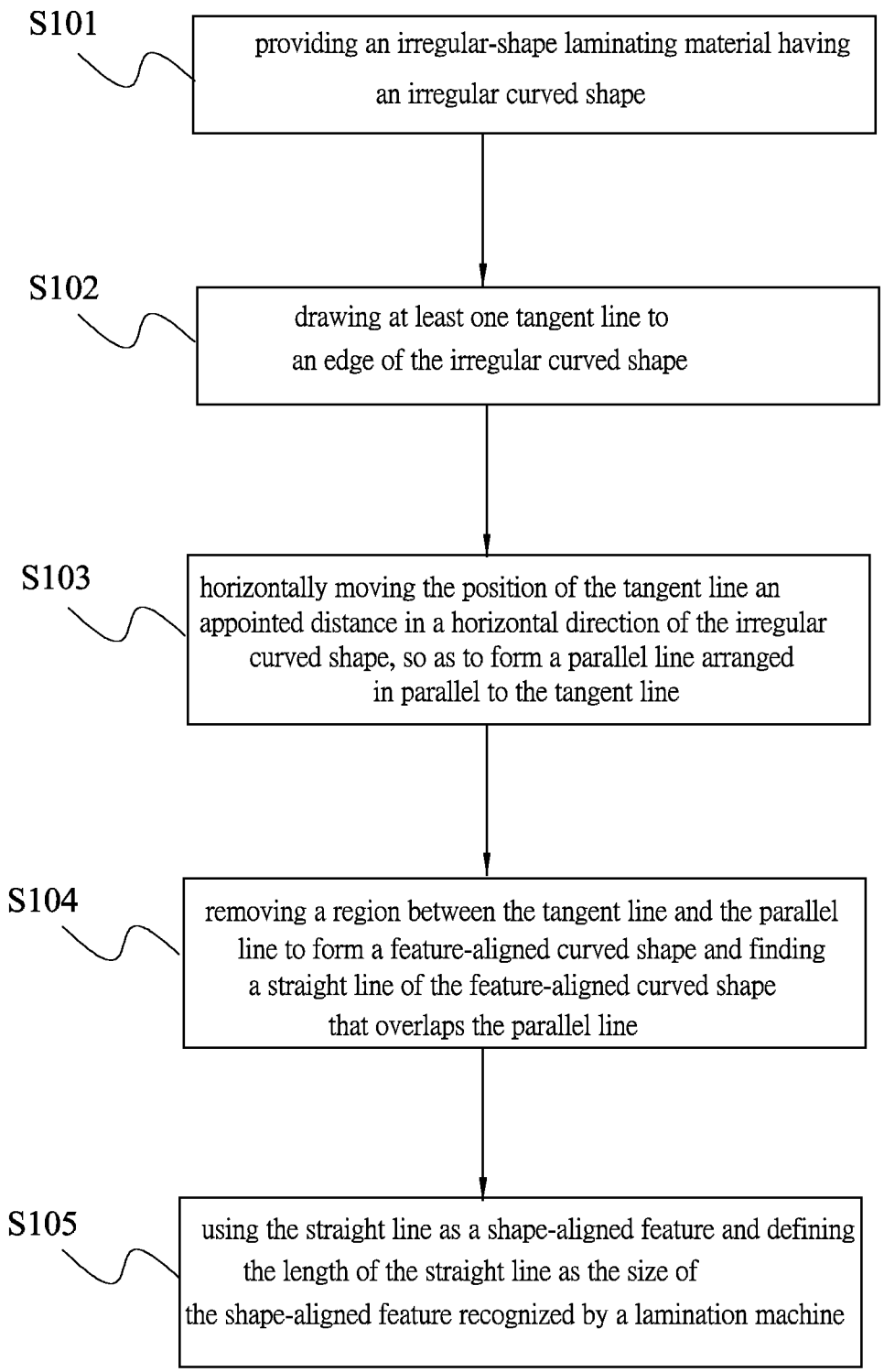
FIG. 1 is a flowchart showing a method for laminating and aligning an irregular-shape material according to an embodiment of the present invention.

Refer to FIG. 1 and FIGS. 2A-2E. FIG. 1 is a flowchart showing a method for laminating and aligning an irregular-shape material according to an embodiment of the present invention. FIGS. 2A-2E are diagrams showing the steps of laminating and aligning an irregular-shape material according to an embodiment of the present invention. The method for laminating and aligning an irregular-shape material comprises the following steps.

Figure 2A:
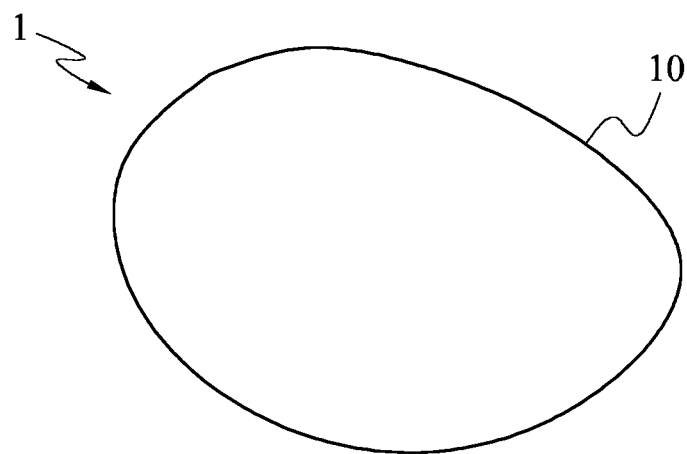
FIGS. 2A-2E are diagrams showing the steps of laminating and aligning an irregular-shape material according to an embodiment of the present invention.

In Step S101 and FIG. 2A, an irregular-shape laminating material 1 having an irregular curved shape 10 is provided. The irregular curved shape 10 may be a non-symmetric shape, such as non-circle or non-ellipse shapes. Thus, the irregular-shape laminating material 1 does not have any shape-aligned feature.

Figure 2B:
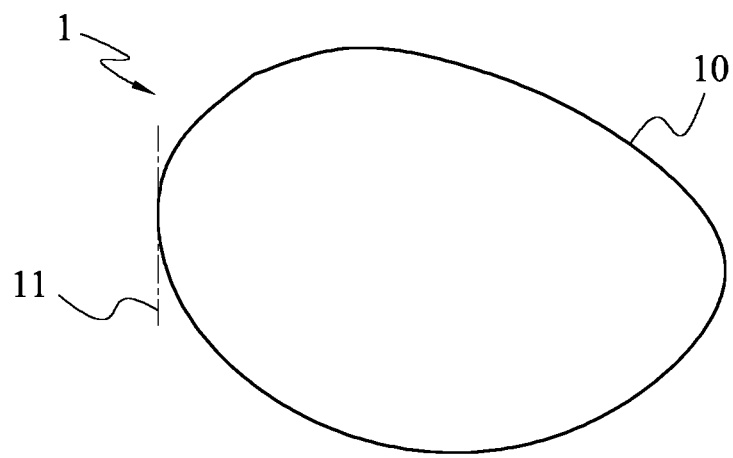

In Step S102 and FIG. 2B, at least one tangent line 11 to the edge of the irregular curved shape 10 is drawn.

Figure 2C:
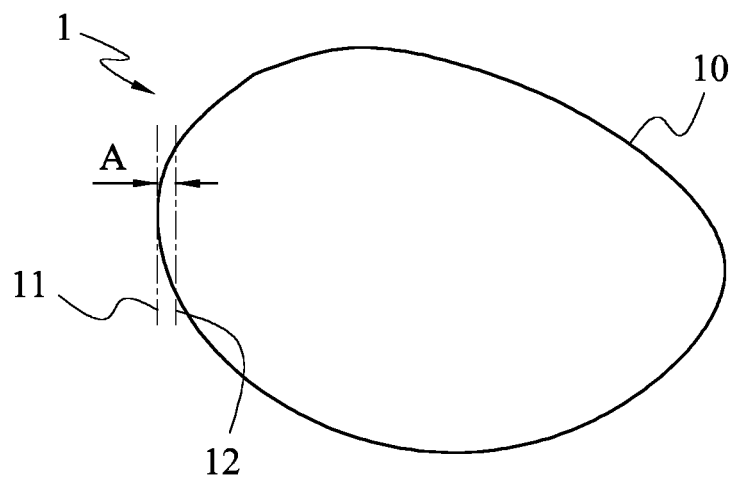

In Step S103 and FIG. 2C, the position of the tangent line 11 is moved an appointed distance A in a horizontal direction of the irregular curved shape 10, so as to form a parallel line 12 arranged in parallel to the tangent line 11 and located in the internal region of the irregular curved shape 10.

Figure 2D:
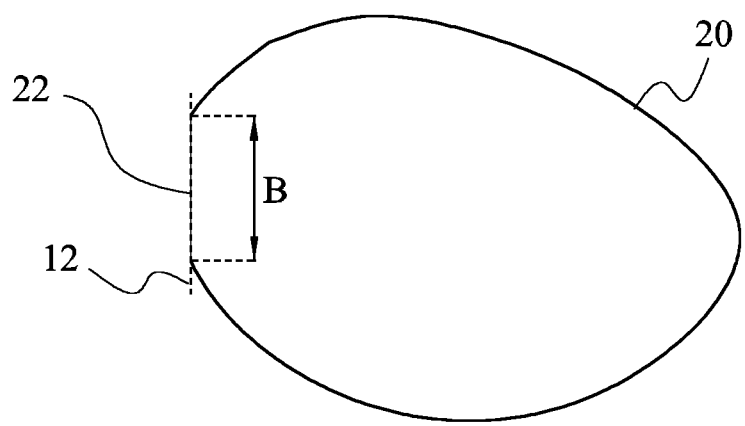

In Step S104 and FIG. 2D, a region of the irregular curved shape 10 between the tangent line 11 and the parallel line 12 is removed to form a feature-aligned curved shape 20 and a straight line 22 of the feature-aligned curved shape 20 that overlaps the parallel line 12 is found.

In Step S105, the straight line 22 is used as a shape-aligned feature of the irregular-shape laminating material 1 and the length B of the straight line 22 is defined as the size of the shape-aligned feature recognized by a lamination machine. In the present invention, the size of the shape-aligned feature (namely the length B) is defined according to an alignment mechanism. Specifically, the size of the shape-aligned feature is 200 μm when a charge-coupled device (CCD) alignment is used. The size of the shape-aligned feature is 600 μm when a mechanical alignment is used.

Figure 2E:
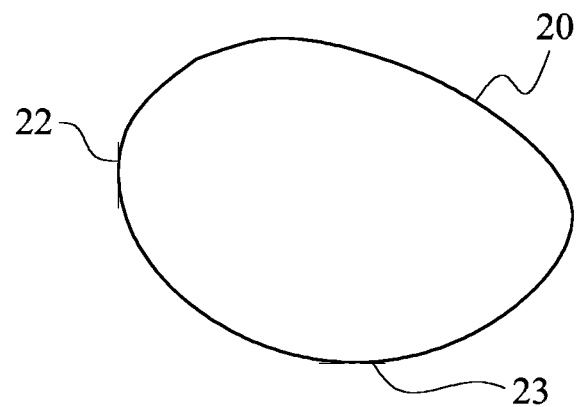

Finally, in FIG. 2E, the feature-aligned curved shape 20 of the irregular-shape laminating material 1 comprises at least one shape-aligned feature. In the embodiment, there are two shape-aligned features, namely straight lines 22 and 23 in FIG. 2E. The straight lines 22 and 23 can guarantee that the irregular-shape laminating material 1 does not overhang over the shape of the laminated object.

The method for laminating and aligning the irregular-shape material is especially used for a 2.5D or 3D soft-to-hard (STH) lamination process and the laminated object comprises glass or plastic, such as polycarbonate (PC) and polymethyl methacrylate (PMMA).

Figure 3:
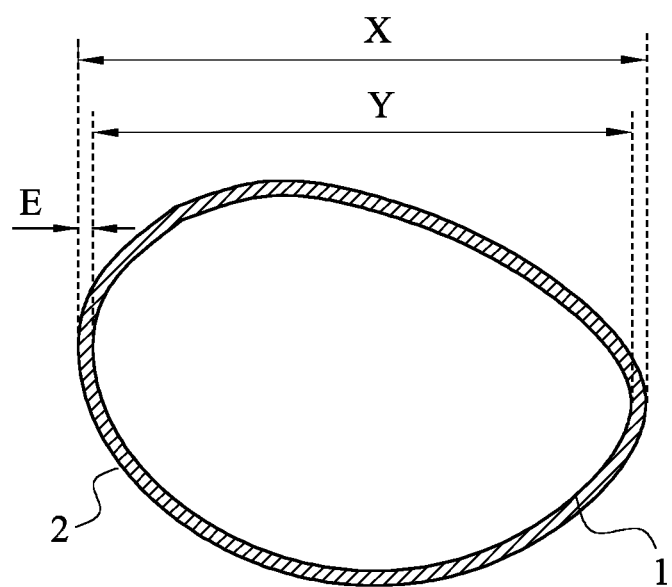
FIG. 3 is a diagram showing an irregular-shape laminating material aligned to a laminated object according to an embodiment of the present invention.

Refer to FIG. 3. FIG. 3 is a diagram showing the irregular-shape laminating material 1 aligned to the laminated object 2 according to an embodiment of the present invention. Using the method for laminating and aligning the irregular-shape material of the present invention, an alignment relationship between the irregular-shape laminating material 1 and the laminated object 2 is defined by a representative equation described as follows:

$$E = \tfrac{1}{2}\sqrt{X^2 + Y^2 + Z^2}$$

Wherein E is an inward-shrinking distance of the irregular-shape laminating material 1 on the laminated object 2;
Z is the lamination tolerance of the lamination machine;
X is the shape tolerance of the laminated object 2; and
Y is the shape tolerance of the irregular-shape laminating material 1.

Figure 4A:
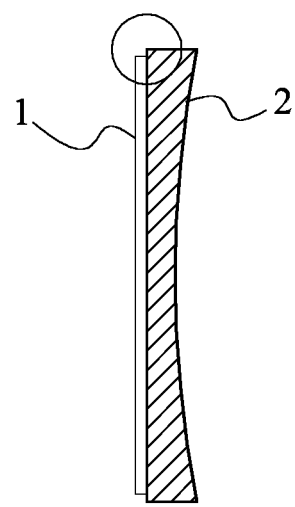
FIG. 4A and FIG. 4B are diagrams respectively showing an applied product using a method for laminating and aligning an irregular-shape material and the partial-enlarged product according to an embodiment of the present invention.
Figure 4B:
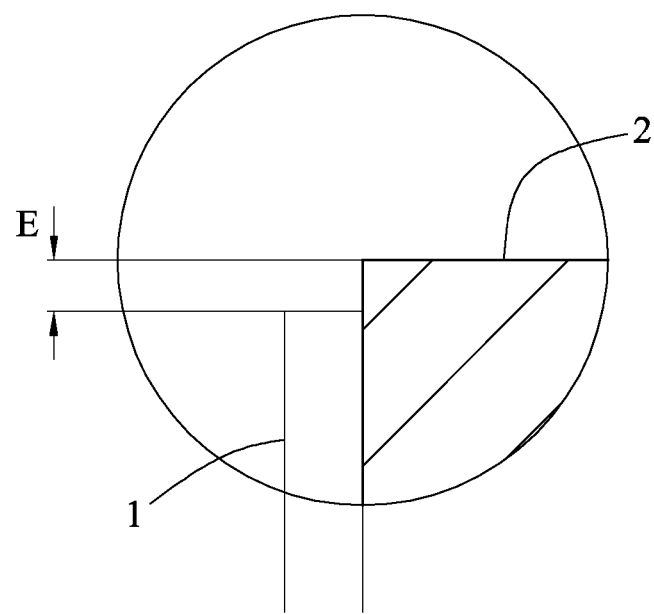

Refer to FIG. 4A and FIG. 4B. FIG. 4A and FIG. 4B are diagrams respectively showing an applied product using a method for laminating and aligning an irregular-shape material and the partial-enlarged product according to an embodiment of the present invention.

The present invention is applied to a product fabricated in a soft-to-hard (STH) lamination process. The irregular-shape laminating material 1 has a thickness of 0.04 mm. The shape-aligned feature of the irregular-shape laminating material 1 inward shrinks by 0.01 mm (10 um). The lamination tolerance of the lamination machine is ±0.19 mm. The inward-shrinking distance E of the irregular-shape laminating material 1 on the laminated object 2 is 0.25±0.2 mm.

Based on a fact that the inward-shrinking distance E of the irregular-shape laminating material 1 on the laminated object 2 is 0.25±0.2 mm, the irregular-shape laminating material 1 does not overhang over the edge of the laminated object 2 after the irregular-shape laminating material 1 is laminated to the laminated object 2. In other words, even if the lamination tolerance is +0.19 mm, the irregular-shape laminating material 1 does not overhang over the edge of the laminated object 2 to affect the appearance of a product. In addition, the irregular-shape laminating material 1 is not laminated to within a viewable region that the outline of the laminated object 2 inward shrinks by 0.5 mm. That is to say, even if the lamination tolerance is −0.19 mm, the viewable region is not affected.

In conclusion, the method for laminating and aligning the irregular-shape material defines the straight line correlated with the tangent line to the shape of the irregular-shape laminating material as the shape-aligned feature recognized by the lamination machine. The present invention is especially used for a 2.5D or 3D soft-to-hard (STH) lamination process to establish the definition of an alignment relationship between the laminating material and the laminated object, thereby adjusting the lamination tolerance, preventing the laminating material from overhanging over the laminated object, and satisfying consumers' aesthetic needs for the appearance of products.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:
1. A method for laminating and aligning an irregular-shape material, and the method comprising:
providing an irregular-shape laminating material having an irregular curved shape;
drawing at least one tangent line to an edge of the irregular curved shape;
horizontally moving a position of the at least one tangent line an appointed distance in a horizontal direction of the irregular curved shape, so as to form a parallel line arranged in parallel to the at least one tangent line;
removing a region between the at least one tangent line and the parallel line to form a feature-aligned curved shape and finding a straight line of the feature-aligned curved shape that overlaps the parallel line; and using the straight line as a shape-aligned feature and defining a length of the straight line as a size of the shape-aligned feature recognized by a lamination machine.

2. The method for laminating and aligning the irregular-shape material according to claim 1, wherein the method is used for a 2.5D or 3D soft-to-hard (STH) lamination process and a laminated object comprises glass or plastic.

3. The method for laminating and aligning the irregular-shape material according to claim 2, further comprising a step of a representative equation described as follows to define an inward-shrinking distance E of the irregular-shape laminating material on the laminated object:

$$E = \tfrac{1}{2}\sqrt{X^2 + Y^2 + Z^2}$$

wherein Z is a lamination tolerance of the lamination machine;

X is a shape tolerance of the laminated object; and

Y is a shape tolerance of the irregular-shape laminating material.

4. The method for laminating and aligning the irregular-shape material according to claim 1, wherein the size of the shape-aligned feature is 200 μm when a charge-coupled device (CCD) alignment is used.

5. The method for laminating and aligning the irregular-shape material according to claim 1, wherein the size of the shape-aligned feature is 600 μm when a mechanical alignment is used.

\* \* \* \* \*